April 10, 1962 H. G. MUENCHINGER 3,028,781
RECESSED HEAD FASTENER WITH OBLIQUE RECESS
Filed June 26, 1958 4 Sheets-Sheet 1
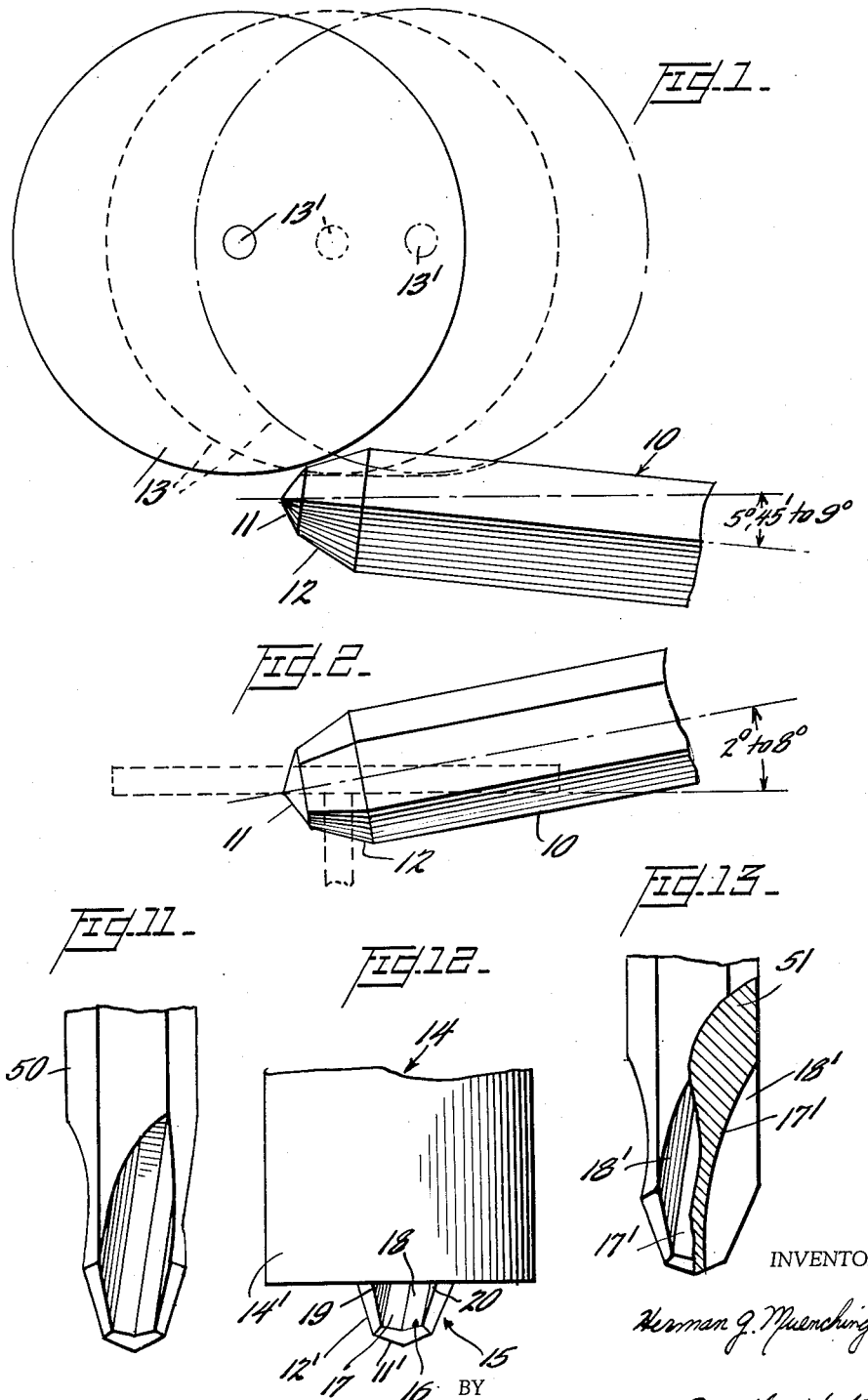
INVENTOR
Herman G. Muenchinger
BY
Watson, Cole, Grindle & Watson
ATTORNEYS April 10, 1962   H. G. MUENCHINGER   3,028,781
RECESSED HEAD FASTENER WITH OBLIQUE RECESS
Filed June 26, 1958   4 Sheets-Sheet 2
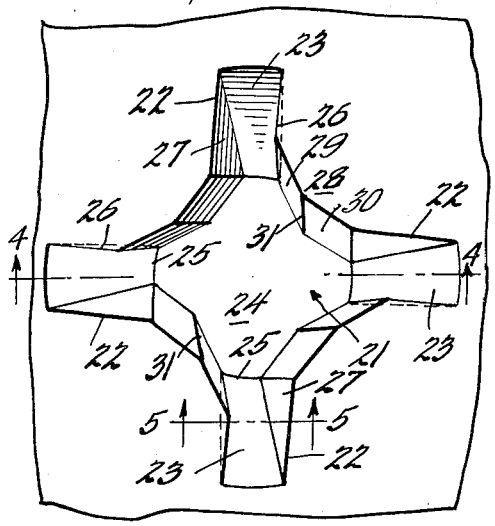
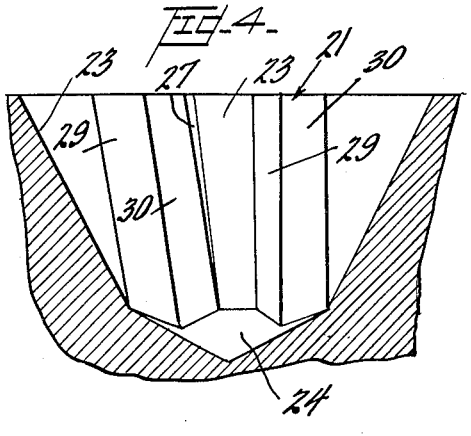
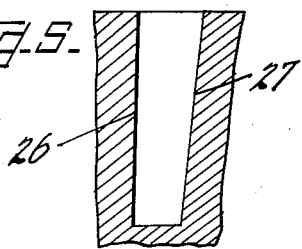
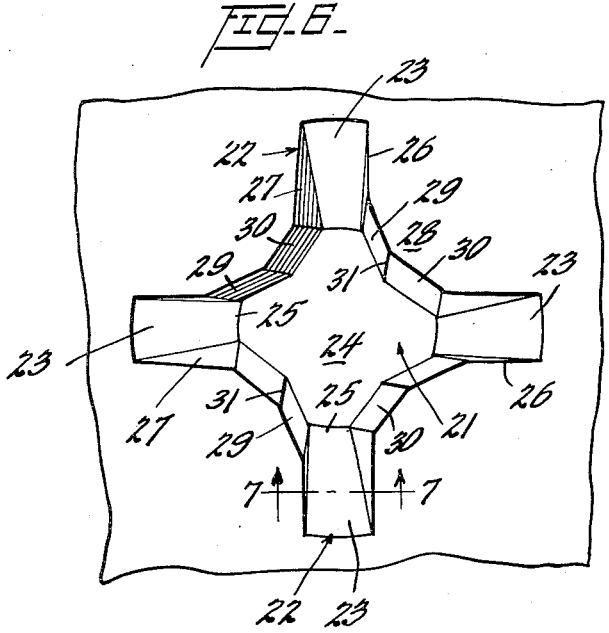
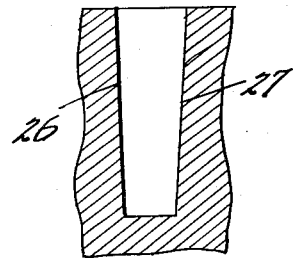
INVENTOR
Herman G. Muenchinger
BY
Watson, Cole, Grindle & Watson
ATTORNEYS April 10, 1962     H. G. MUENCHINGER     3,028,781
RECESSED HEAD FASTENER WITH OBLIQUE RECESS
Filed June 26, 1958     4 Sheets-Sheet 3

INVENTOR
Herman G. Muenchinger
BY
Watson, Cole, Grindle & Watson
ATTORNEYS

United States Patent Office 3,028,781
Patented Apr. 10, 1962

3,028,781
RECESSED HEAD FASTENER WITH
OBLIQUE RECESS
Herman G. Muenchinger, Chaplin, Conn., assignor, by mesne assignments, to Phillips Screw Company, East Boston, Mass., a corporation of Delaware
Filed June 26, 1958, Ser. No. 744,712
8 Claims. (Cl. 85—45)

This invention relates to recessed head fasteners of the type having a generally cruciform tool-engaging recess in the head or driving end thereof, an example being the well-known "Phillips" screw. Screws of this character currently produced are manufactured in general conformity with the disclosure of United States Patent No. 2,474,994, granted July 5, 1949, and the general object of the present invention is the provision of a tool-engaging recess for fasteners and the like constituting an improvement upon the recess disclosed in said patent.

Although screws and other fasteners provided with tool-engaging recesses of the type disclosed in the aforesaid United States patent have gone into very widespread use, and with generally satisfactory results, the demands of modern assembly line practice, and the increasing torque capacity requirements imposed upon such fasteners, have created a constant demand for improvements in the field of fastener recesses and driving tools. One area in which such improvement has been widely sought is that of stability, namely, constancy of alignment between fasteners and driving tool or, in other words, elimination of "wobble" of the tool in the recess. The present invention is directed primarily to the alleviation or elimination of conditions giving rise to the aforesaid "wobble."

The wobble or looseness of fit between driving tool and fastener recess is particularly troublesome in assembly line practice, and is more pronounced in connection with the use of screws or other fasteners of the protruding head type, that is, screws in which the underside of the head is flat rather than countersunk. This results from the well-known circumstance that the aforesaid looseness or wobble is caused, in large degree, by the "fall-away" of the metal of the fastener during the punching of the recess, which fall-away is greater in the case of protruding head screws than in the case of countersunk head screws because of the greater confinement of the latter during punching, due to the shape of the forging machine die used in producing it.

It is a general object of the present invention to provide an improved tool-engaging recess for screws and the like, in which the adverse effect of metal fall-away is largely overcome, so that recessed fasteners made according to the invention may be driven, with the use of conventional driving tools, with a minimum of wobble or misalignment between the tool and the fastener recess.

More specifically, the object of the present invention is to provide a recess of the character described, comprising a central recess portion and radiating grooves separated by inwardly projecting ribs, in which the driving walls of the grooves and ribs, i.e. those walls against which the cooperating surfaces of the driver tool make contact during the driving operation, are so oriented as to make close contact with a conventional driving tool, substantially eliminating the aforesaid looseness or wobble between them. This is accomplished by forming the recess through the use of a punch which is so formed that the aforesaid driving walls of the grooves and ribs of the fastener recess, after punching, bear such angular relationship to the axis of the screw or other fastener as to counterbalance or eliminate the effect of metal fall-away during the punching step.

It should be understood that while improved results are obtained by using the novel recess of the present invention with drivers of conventional design, still better results may be obtained by using the improved recess with a corresponding driving tool, described below.

Other and further objects, features and advantages will be apparent from the description which follows, read in connection with the accompanying drawings in which—

FIGURE 1 is a diagrammatic view illustrating the orientation of a punch, in process of manufacture, to the milling cutter with which it is being shaped;

FIGURE 2 is a view at 90° to FIGURE 1;

FIGURE 3 is a plan view of a fastener recess formed in accordance with the present invention;

FIGURE 4 is a section on line 4—4 of FIGURE 3;

FIGURE 5 is a section on line 5—5 of FIGURE 3;

FIGURE 6 is a view similar to FIGURE 3, but illustrating a slightly different form of recess in accordance with the invention;

FIGURE 7 is a sectional view on line 7—7 of FIGURE 6;

FIGURE 11 is a partial side elevation of a driving tool especially formed for use with a fastener made in accordance with the invention;

FIGURE 12 is a partial side elevation of a cold header punch for forming the improved recess.

FIGURE 13 is a view partly in side elevation and partly in vertical section, showing a slightly different embodiment of the driving tool;

Figure 8:
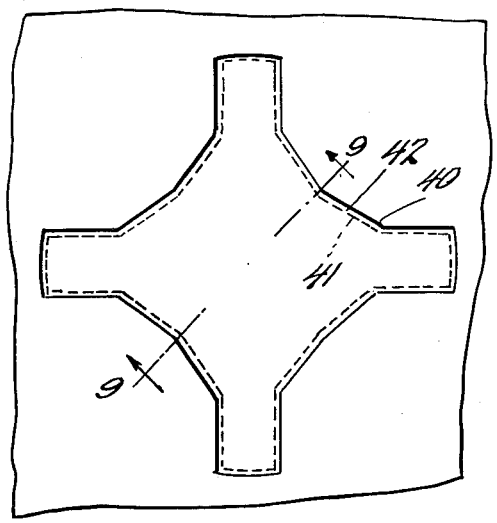
FIGURE 8 is a plan view of a conventional "Phillips" recess with the tip of a conventional driving tool (illustrated in dotted lines) inserted therein.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

An understanding of the novelty characterizing the recess of the present invention may perhaps be most easily gained by considering first, the novel technique employed in their production. Master punches which determine the shape and dimensions of the heading punches used in cold forming tool-engaging recesses of the type in question, are produced by machining or a similar method such as form grinding. Thus, referring to FIGURES 1 and 2, a bar 10 of tool steel, of round or polygonal section, is first provided with a generally conical tip 11 and a frusto-conical surface 12 connecting the tip 11 with the portion 10 of uniform section, after which the work is presented to a milling cutter 13 for cutting a plurality of angularly spaced flutes in the tip 11 and portion 12, leaving undisturbed wing portions between the flutes. The cutter 13 is rotated about a center 13' which is moved relative to the bar 10 as indicated; or if desired, the work may be traversed while the cutter rotates about a fixed center. The finished form of the tool will be described hereinafter, in connection with FIGURE 12.

In order to provide the so-called vertical taper of the walls of alternate flutes and wings of the tool, the axis of the latter is disposed at an angle to the direction of traverse of the milling cutter, or the direction of relative movement between the work and the milling cutter during the cutting operation, such angle being measured in the plane of rotation of the milling cutter 13. This angle is known as the "milling angle" and may have a value of between 5°45' and 9°, depending upon the amount of vertical taper desired to be imparted to the said flute and wing walls. In conventional practice, the tool axis is disposed in the plane of rotation of the milling cutter, and corresponding flute and wing walls formed on the tool will taper equally on either side of the cut.

In carrying out the present invention, a further and novel factor is introduced by tilting the axis of the tool out of the plane of rotation of the milling cutter as seen in FIGURE 2, the angle of tilt being from 2° to 8°, depending upon the degree of obliquity which it is desired to incorporate in the punch, and in the recesses formed by the use of the punch. The result of the aforesaid tilting of the tool axis relative to the plane of rotation of the milling cutter is to produce flutes which are disposed obliquely to the axis of the tool as illustrated, for example, in FIGURES 11, 12 and 13. FIGURES 11 and 13 illustrate driving tools, while FIGURE 12 illustrates a cold header punch 14, the latter comprising a tool such as illustrated in FIGURES 1 and 2 after the latter is fixed, by a process with which the present invention is not concerned, in a body 14' so that only the nib 15, corresponding to the desired fastener recess, remains exposed. As will be seen in FIGURE 12, the nib 15 comprises a particonical tip 11' and a plurality of surface portions 12' corresponding to the tip 11 and surface 12 of FIGURE 1 as modified by the action of the milling cutter 13. In the milling operation the tip 11 and surface 12 have been cut away to provide flutes 16 corresponding in shape to the cutting edge of the milling cutter 13. In the illustrated embodiment, each flute 16 is defined by internal walls 17 and 18 and generally radial wing walls 19 and 20, all of which walls are disposed obliquely, or "skewed," in relation to the angularity which they would have borne to the tool axis if the tilt illustrated in FIGURE 2 had not been employed in their formation. The exact relationship of the walls 17, 18, 19 and 20 to each other and to the tool axis will be better understood from a detailed description of the fastener recess (FIGURE 3 or FIGURE 6) formed by use of the punch of FIGURE 12.

The recess formed by punching a blank with the tool just described has the appearance, when seen in plan of a recess otherwise similar to that of the aforesaid U.S. Patent No. 2,474,994 except that the lower end of the recess has been rotated in a clockwise (in the case of clockwise driving; counter-clockwise if the fastener is to be driven by counter-clockwise rotation) sense relative to the upper end of the recess. The recess of FIGURE 3 illustrates a certain degree of said rotation, or obliquity, while that of FIGURE 6 illustrates a lesser degree thereof. These two recesses are otherwise identical, and their corresponding parts are indicated by like reference numerals.

Each recess of the present invention comprises a generally conical central portion 21 of generous size, to promote ease of driver entry, and a plurality of generally radial grooves 22 opening thereinto. The end walls 23 of the grooves, which slope inwardly and downwardly, intersect the blunt, generally conical bottom wall 24 of the central portion 21 along arcuate lines 25. Each groove 22 has a driving side wall 26 and a removal side wall 27, while the ribs 28 separating the grooves 22 are bounded by an inwardly facing surface of substantial horizontal extent (i.e., in a plane normal to the screw axis) consisting, in FIGURES 3 and 6, of walls 29 and 30 intersecting in a line 31. The rib wall 29 connects with groove driving wall 26 and rib wall 30 connects with groove removal wall 27. As will be seen, the rib walls 29, as well as the groove walls 26, constitute driving walls in that they make good torque-transmitting engagement with the corresponding walls of a driving tool, whether the latter is of conventional form or is shaped according to the present invention. In the recesses of FIGURES 3 and 6 the rib walls 29 and 30 are of equal width in any plane normal to the fastener axis, whereby the line 31 is the median element of the inwardly facing rib surface consisting of the two said walls. Each of the said walls is also of uniform width from top to bottom of the recess. It will be noted that the line 31 does not intersect the fastener axis, as in the case of the symmetrical recess of U.S. Patent No. 2,474,994, but passes laterally thereof, the lower end of said line being angularly displaced in the driving direction relative to the upper end of said line.

The result of the described orientation of the ribs 28 (or, it might be said, of the flutes 16 of the punch) upon the vertical inclination of the groove walls 26 and 27, and rib walls 29 and 30, is that the inclination of the driving walls 26 and 29, relative to the fastener axis, is decreased while that of the removal walls 27 and 30 is increased. Thus, while the included vertical angle between walls 26 and 27 may be substantially between 8° and 10°, as set forth in said U.S. Patent No. 2,474,994, the vertical inclinations of the respective walls are not equal and opposite, but the vertical inclination of wall 26 may be decreased to substantially 0°, as seen in FIGURE 6, or even reversed to a slight negative value, as seen in FIGURE 3, while the vertical inclination of wall 27 is increased accordingly. By the same token, the vertical inclination of rib wall 29, relative to the fastener axis, is decreased to a value between about 2½° and 8½°, while that of rib wall 30 is increased to a value between about 5½° and 10½°. The said angles of inclination are measured in planes parallel to the fastener axis and perpendicular to the wall surfaces in question, and is that angle included between the intersections of said perpendicular plane with said wall, on one hand, and a plane containing he axis and perpendicular to said first perpendicular plane, on the other. This decrease in the inclination of walls 26 and 29 is of great significance, as it enables the orientation of those walls to correspond with the inclinations of the cooperating surfaces of a conventional driving tool, thus considerably improving the stability of driving engagement between the tool and recess, and enhancing the torque-transmitting capacity of the couple as a result. Also, though the included vertical angle between groove walls 26 and 27 may be increased beyond 10°, by increasing the milling angle, the "throw-out" effect is not enhanced by such increase in included angle, because the driving walls 26 and 29 are more erect than before.

Figure 9:
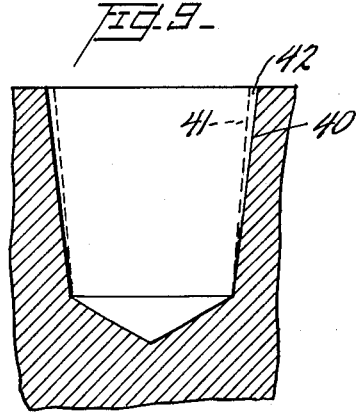
FIGURE 9 is a section on line 9—9 of FIGURE 8.
Figure 10:
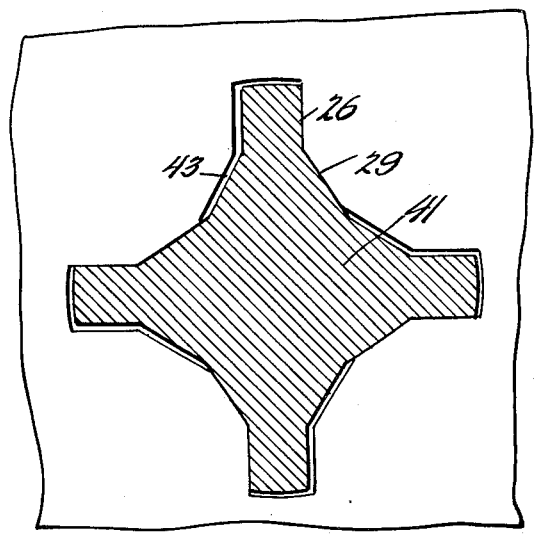
FIGURE 10 is a plan view of a recess formed in accordance with the present invention, with the tip of a conventional driving tool inserted therein.

The effect described in the preceding paragraph is illustrated in FIGURES 8, 9 and 10. FIGURES 8 and 9 show in outline a conventional symmetrical recess 40 and (in dotted lines) the tip 41 of a conventional driving tool, the latter fitting rather loosely in the former due to the clearance 42 resulting from metal fall-away in punching the recess. The clearance 42 diminishes downwardly, as seen in FIGURE 9, so that while the tool 41 fits the recess rather closely at the bottom, it may nevertheless be quite loose at the top, resulting in instability. This effect may not be overcome by simply changing the inclination of the appropriate punch surfaces, for the reason that metal fall-away does not follow a linear law, but may result in formation of curved surfaces, and may vary in response to a number of factors which have not been fully determined or evaluated.

While I do not wish to be bound by statements of theory, experimentation appears to confirm the view that metal fall-away in the formation of recesses by punching depends upon, among other factors, the material being punched, and the angles of inclination of the punch surfaces; and that, for any given set of conditions, fall-away will have a relatively definite value. By means of the present invention, the milling angle of the punch may be set at that value which will result in minimum fall-away of the particular metal to be punched, and then the axis of the punch may be tilted relative to the plane of rotation of the milling cutter to orient the driving walls of the resulting recess as required to provide good driving engagement with the corresponding walls of the conventional driver. This result is shown in FIGURE 10, in which the same driver 41, indicated in dotted lines in FIGURES 8 and 9, is seen in horizontal section, seated in a recess 43 of the present invention, for example, a recess such as that of FIGURE 6. It will be noted that, because the walls 26 and 29 of the recess have been brought into contact with the respective corresponding surfaces of the driver 41, at least over the upper portions of those recess walls, the driver seats firmly in the recess, and stability of the couple is greatly improved.

If the obliquity of the improved recess is such that the inclination of walls 26 and 29 just equals that of the corresponding driver surfaces, planar driving contact will result. If the obliquity of the recess is greater, and walls 26 and 29 are more nearly vertical than those of the driver, planar engagement will not occur, but the stability and torque capacity of the couple will still be improved. By the same token, the "throw-out" component of the torque applied will be reduced because of the reduced angularity of the driving walls of the recess.

If the improved recess is used in cooperation with a driver having a like obliquity and milling angle, and assuming that the angularity of the recess walls 26 and 29 is such that virtually no fall-away occurs in those walls during punching of the recess, the driver will exactly fit the recess walls 26 and 29 and the driving contacts will be planar, resulting in the maximum torque capacity. Such planar engagement reduces the "throw-out" force, which is also diminished by reason of the small vertical angle of the driving walls.

The driving tool 50 of FIGURE 11 is made of suitable steel by the technique already described in connection with FIGURES 1 and 2, and may be made to conform to any recess produced in accordance with the invention. The tool 50 is produced by relative movement of the milling cutter and the tool in a direction inclined to the tool axis as specified above. However, the milling operation may also be performed by moving the cutter into the tool (or vice versa) along a line at 90° to the said direction, this technique being known as "plunge" milling. This operation produces a tool such as the tool 51 of FIGURE 13, in which the circular curvature of the milling cutter results in a longitudinal curvature of the internal walls 17', 18' of each flute. Since the said walls are substantially axially directed over their lower portions, the slight curvature mentioned does not adversely affect the operation of the tool. Such a form on the tool could be made to complement a recess having natural fall-away assuming a curved shape, as mentioned above, or to complement a recess produced with a punch made purposely with curved surfaces to minimize natural fall-away.

Figure 14:
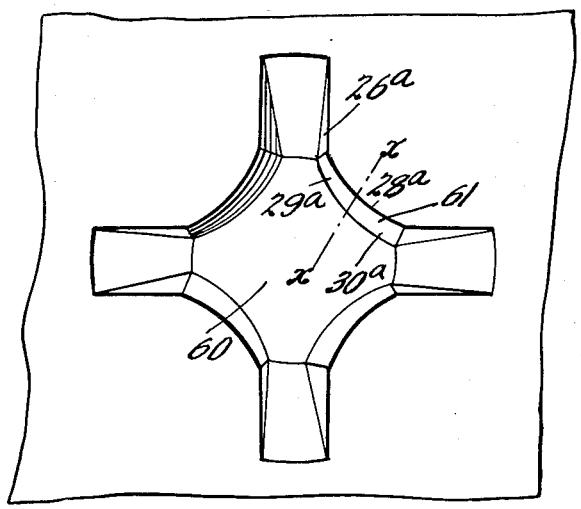
FIGURE 14 is a view similar to FIGURE 3, illustrating a further embodiment of the improved recess.
Figure 15:
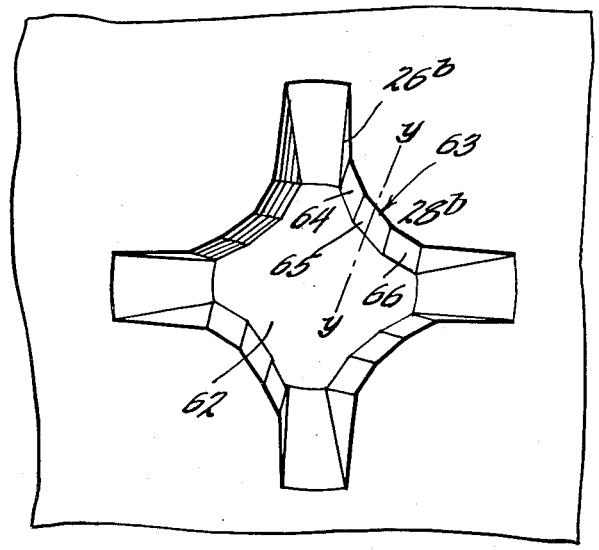
FIGURE 15 is a view similar to FIGURE 3 illustrating a still further embodiment of the improved recess.

FIGURES 14 and 15 illustrate variations of the recess formed according to the invention. In the recess 60 of FIGURE 14, the inwardly directed surface 61 of each rib 28a is a single substantially parti-cylindrical surface, the curvature of which is such that it has a decreasing inclination to the fastener axis as it approaches the driving groove wall 26a. The said inclination is measured in a plane parallel to the fastener axis and perpendicular to a plane which is tangent to the surface 61 at the portion in question, and is that angle included between the intersections of said perpendicular plane with said tangent plane, on one hand, and a plane containing the axis and perpendicular to said first perpendicular plane, on the other. The median line X—X, separating the driving and removal wall portions 29a and 30a, respectively, passes laterally of the fastener axis, like the line 31 of FIGURES 3 and 6. In FIGURE 15 the ribs 28b of recess 62 are bounded by an inwardly facing surface 63 comprising three intersecting wall portions 64, 65 and 66 of which 64 has the least inclination to the fastener axis, 66 the greatest, and 65 an intermediate value. The median line Y—Y of surface 63 passes laterally of the fastener axis as in the case of line 31 of FIGURES 3 and 6, and line X—X of FIGURE 14.

Having thus described the invention, what is claimed as new and desired to be secured by Letters Patent is:

1. A fastener having a socket extending into its upper end along its longitudinal axis and comprising a central portion and grooves radiating therefrom, each said groove having a driving wall, an opposite wall and a bottom, said driving and opposite walls converging downwardly at different vertical angles of inclination, the vertical angle of inclination of said driving wall being less than that of said opposite wall, said central portion having a bottom merging with the bottoms of said grooves, and said central portion being peripherally bounded by inwardly projecting ribs separating adjacent grooves, each said rib having at least two inwardly facing walls intersecting one another and including a driving wall portion of substantial horizontal extent intersecting the adjacent groove driving wall at an obtuse angle and a removal wall portion intersecting the adjacent opposite groove wall at an obtuse angle, said portions being of equal and uniform width from top to bottom, said inwardly facing walls of each said rib having surfaces which mutually intersect in at least one inwardly and downwardly inclined line passing laterally of the said longitudinal axis, the lower end of each said line being angularly displaced in the driving direction relative to the upper end of the same line.

2. A fastener having a socket extending into its upper end along its longitudinal axis and comprising a central portion and grooves radiating therefrom, each said groove having a driving wall, an opposite wall and a bottom, said driving and opposite walls converging downwardly at different vertical angles of inclination, the vertical angle of inclination of said driving wall being less than that of said opposite wall, said central portion having a bottom merging with the bottoms of said grooves, and said central portion being peripherally bounded by inwardly projecting ribs separating adjacent grooves, each said rib having two inwardly facing walls intersecting one another and including a driving wall portion of substantial horizontal extent intersecting the adjacent groove driving wall at an obtuse angle and a removal wall portion intersecting the adjacent opposite groove wall at an obtuse angle, said portions being of equal and uniform width from top to bottom, said inwardly facing walls of each said rib having surfaces which mutually intersect in an inwardly and downwardly inclined line passing laterally of the said longitudinal axis, the lower end of said line being angularly displaced in the driving direction relative to the upper end of the same line.

3. A fastener having a socket extending into its upper end along its longitudinal axis and comprising a central portion and grooves radiating therefrom, each said groove having a driving wall, an opposite wall and a bottom, said driving and opposite walls converging downwardly at different vertical angles of inclination, the vertical angle of inclination of said driving wall being less than that of said opposite wall, said central portion having a bottom merging with the bottoms of said grooves, and said central portion being peripherally bounded by inwardly projecting ribs separating adjacent grooves, each said rib having two inwardly facing walls intersecting one another and including a driving wall portion of substantial horizontal extent intersecting the adjacent groove driving wall at an obtuse angle and a removal wall portion intersecting the adjacent opposite groove wall at an obtuse angle, said portions being of equal and uniform width from top to bottom, that inwardly facing wall of each said rib which joins the driving wall of an adjacent groove being inclined inwardly and downwardly at a lesser angle to said axis than that of the other inwardly facing wall of the same rib.

4. A fastener having a socket extending into its upper end along its longitudinal axis and comprising a central portion and grooves radiating therefrom, each said groove having a driving wall, an opposite wall and a bottom, said driving and opposite walls converging downwardly at different vertical angles of inclination, the vertical angle of inclination of said driving wall being less than that of said opposite wall, said central portion having a bottom merging with the bottoms of said grooves, and said central portion being peripherally bounded by inwardly projecting ribs separating adjacent grooves, each said rib having an inwardly facing surface including a driving wall portion of substantial horizontal extent intersecting the adjacent groove driving wall at an obtuse angle and a removal wall portion intersecting the adjacent opposite groove wall at an obtuse angle, said portions being of equal and uniform width from top to bottom, said surface tapering inwardly and downwardly at a vertical angle to said axis which is least in that portion of said surface adjacent the said driving wall of a groove and greatest in that portion of said surface adjacent the said opposite wall of a groove, the median element of said surface between its respective intersections with the walls of adjacent grooves separating said driving wall portion from said removal wall portion and lying in a line passing laterally of said longitudinal axis, the lower end of said line being angularly displaced in the driving direction relative to the upper end of the same line.

5. A fastener as defined in claim 4, each said inwardly facing rib surface being continuously curved.

6. A fastener as defined in claim 4, each said inwardly facing rib surface comprising a plurality of intersecting surface portions of differing vertical inclination.

7. A fastener as defined in claim 4, each said inwardly facing rib surface comprising three intersecting surface portions of differing vertical inclination.

8. A fastener as defined in claim 4, said driving wall portion having a vertical inclination of between about 2½° and 8½°, and said removal wall portion having a vertical inclination of between 5½° and 10½°.

References Cited in the file of this patent

UNITED STATES PATENTS

| | | |
|---|---|---|
| 2,046,839 | Phillips et al. | July 7, 1936 |
| 2,285,462 | Purtell | June 9, 1942 |
| 2,474,994 | Tomalis | July 5, 1949 |
| 2,538,350 | Baule | Jan. 16, 1951 |
| 2,592,462 | Phipard | Apr. 8, 1952 |
| 2,601,453 | Phipard | June 24, 1952 |
| 2,673,359 | Stellin | Mar. 30, 1954 |
| 2,800,829 | West | July 30, 1957 |
| 2,800,936 | West | July 30, 1957 |